(No Model.) 2 Sheets—Sheet 2.
F. D'A. GOOLD.
STORAGE BATTERY SYSTEM.
No. 565,741. Patented Aug. 11, 1896.
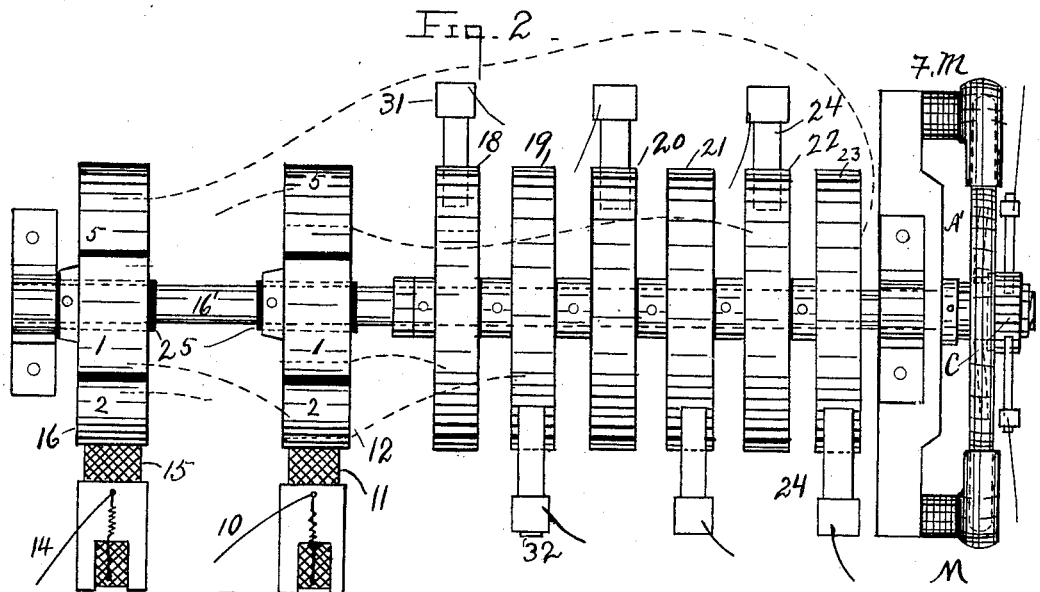
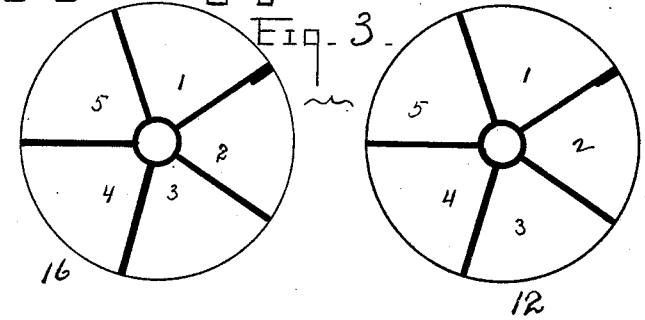
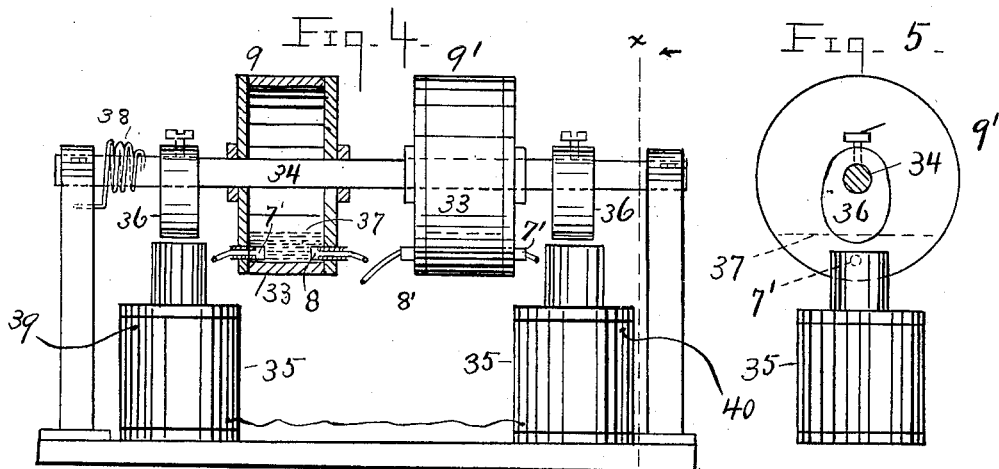
Witnesses
G. H. Stocking
C. L. Belcher
Inventor
F. D'A. Goold
By his Attorney
Charles M. Catlin

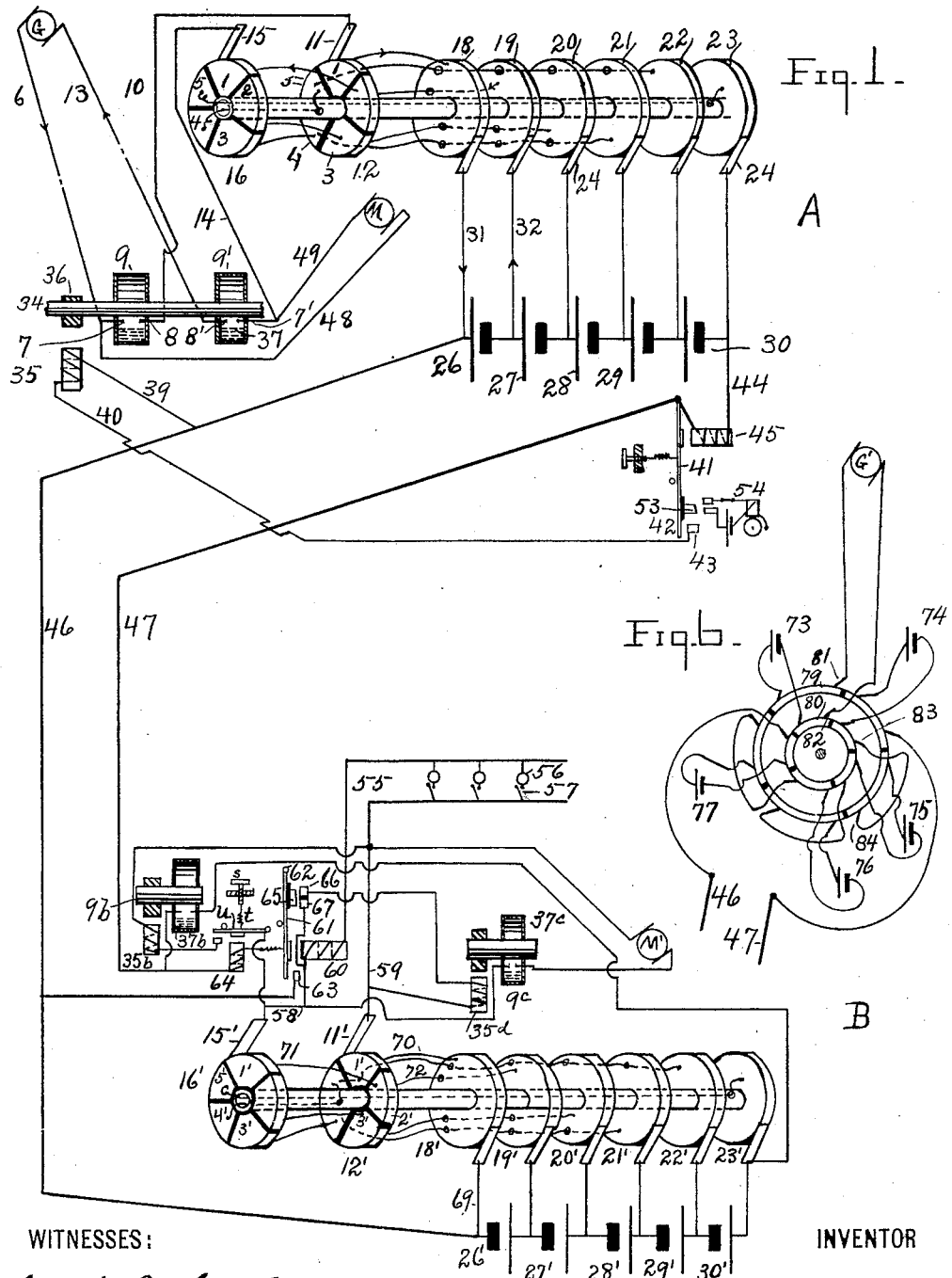

UNITED STATES PATENT OFFICE.

FREDERICK D'A. GOOLD, OF BROOKLYN, NEW YORK, ASSIGNOR TO THE GENERAL ELECTRIC COMPANY, OF NEW YORK.

STORAGE-BATTERY SYSTEM.

SPECIFICATION forming part of Letters Patent No. 565,741, dated August 11, 1896.

Application filed February 27, 1896. Serial No. 581,052. (No model.)

*To all whom it may concern:*

Be it known that I, FREDERICK D'A. GOOLD, a citizen of the United States, and a resident of Brooklyn, county of Kings, and State of New York, have invented certain new and useful Improvements in Transformer Systems and Automatic Controlling Devices, of which the following is a specification.

One object of this invention is to provide an improved system and apparatus whereby a low-tension continuous or direct current can be employed to charge several groups of storage-cells, group by group, at a suitable transformer-station, which groups of cells can be discharged in series into a discharge or consumption circuit. A definite number of groups of cells is continually connected in series to the discharge-circuit when the system is in use, the groups being successively connected momentarily to the charging-circuit and withdrawn therefrom without changing the number of groups connected in series to the discharge-circuit.

Another object is to provide the storage-cell-transformer systems with automatic controlling devices.

Other features of the invention will hereinafter appear.

In the drawings, Figure 1 is a diagram of a system embodying the invention. Fig. 2 is a plan view of the preferred commutator device. Fig. 3 is a side view of the segmental commutator-wheels detached. Fig. 4 is a side view, partly in section, of the preferred automatic circuit maker and breaker. Fig. 5 is a section on line $x\ x$, and Fig. 6 shows a modified system to be described.

A B are two transformer-stations at any suitable distance apart. At station A, or connected thereto by a circuit, is a direct-current low-tension generator G, from one terminal of which extends a wire 6 to one terminal, 7, of the automatic circuit-maker 9. From the other terminal, 8, of the same circuit-maker leads wire 10 to brush 11, bearing on the commutator-wheel 12, which wheel has as many equal segments 1 2, &c., insulated from each other and from their shaft, as there are groups of storage or current-regulating cells—in the system illustrated five, though many more would be used in practice. From the other terminal of generator G leads a wire 13 to one of the terminals 8' of a second circuit-maker 9', from terminal 7' of which leads a wire 14 to brush 15, bearing on commutator-wheel 16 like wheel 12.

In Figs. 2 and 3, 16' is a shaft with a driving electric or other motor M, the shaft having the wheels 12 16 and as many smooth wheels or disks 18 19 20 21 22 23, insulated from each other and from the shaft, as there are groups of cells to be charged, plus one. On each disk bears a brush 24. The disks 18 to 22 are connected in regular order to the segments of wheel 12, and wheel 23 is connected directly to segment 5 of wheel 16, Fig. 1. The segments of wheel 12 are connected with the segments of wheel 16, as shown in Fig. 1, *i. e.*, segments 2 3 4 5 of wheel 12 to 1 2 3 4 of wheel 16, segments 1 and 5 not being cross-connected. 25 are bushings insulating the wheels from their shaft. The insulation between the segments of the wheels is just about the same thickness as the bearing end of brushes 11 15, but the insulation between segments 1 2 is a trifle thicker than said brushes to prevent the brushes closing a short circuit of the series of groups of cells.

F M is the field-magnet, A' the armature, and C the commutator, of the electric motor. 26 to 30 are groups of storage-cells, as unformed lead plates in a suitable liquid. In the drawings each group is indicated by a single cell. These are connected in regular order to brushes 24 by wires 31-32.

In Figs. 4 and 5 the automatic circuit-makers 9 9' are shown. They consist of insulating-cylinders 33, with ends closing them air-tight and mounted on a single axis 34, on which also are fixed one or more iron eccentrics 36, which serve as armatures for magnet 35. When a single side of a circuit only is to be made and broken, but one of the devices 9 9' will be used. Extending through the ends of each cylinder are terminals 7 8, (or 7' 8',) normally separated, but electrically connected by mercury or other suitable mobile conducting material 37, when armatures 36 are attracted, as shown in Fig. 4. The wall of the chamber being cylindrical, or, at least, the lower part being curved, the chamber can be moved without raising the weight of the mercury, since as the chamber turns the mercury will continually fall back to the bottom of the chamber and resistance will be simply the friction.

38 is a spring which, when magnets 35 are deënergized, turns shaft 34 and parts thereon far enough to carry the terminals out of the mercury. The terminals are in such position in Fig. 1, the armatures being away from their magnets.

Magnet 35, Fig. 1, is connected by wire 39 to one terminal of the series of cells 26 to 30, and by wire 40, armature-lever 41, (when attracted the end 42 resting on contact 43,) and wire 44, including coil 45, to the opposite terminal of the series of cells. Wires 46 47 of the high-tension discharge or consumption circuit connect to the same terminals and extend to the point where the discharge-current is to be utilized, namely, in the system illustrated, to a second transformer-station B. Motor M is connected to the generator-circuit by wires 48 49 50 and through a circuit-maker. Circuit-maker 9' may be utilized for this purpose, but this is not necessary.

53 is a circuit-maker which is adapted to close the bell-circuit 54 to notify the engineer that current is being drawn from the cells 26 to 30 and to start generator G, if it is at rest.

At station B the commutating device 16' 12', &c., is of the same construction as that described in connection with station A, parts 16 12, &c.

26' to 30' are groups of cells (which form the translating or current-consuming devices for the first series of cells) to be charged in series from circuit 46 47 and to be discharged, group by group, into a low-tension lighting or other consumption circuit 55, having translating or current-consuming devices, as lamps 56. 57 are switches for closing the lamp-circuits. From commutator-brushes 15' 11' wires 58 59 extend to the second discharge or consumption circuit 55. Wire 58 includes magnet 60, the armature-lever 61 of which is pivoted at 62 and normally stands away from the magnet, as shown. When attracted, it bears against contact 63 and closes the circuit of magnet 64 between wires 46 47. At the same time the insulated conducting-piece 65 connects contacts 66 67, closing circuit, through magnet 35$^d$ of circuit-maker 9$^c$, between wires 58 59. The armature of magnet 64 is adapted to close circuit through magnet 35$^b$ of circuit-maker 9$^b$.

The operation of the described system is as follows: It is assumed that the groups of cells 26 to 30 and 26' to 30' have an initial charge and that the system is in the condition indicated in Fig. 1. When one or more lamps 56 are thrown into circuit by closing switches 57, current is immediately furnished thereto by the discharge of the group of cells which is at the moment connected to the segments of the commutator on which the brushes 15' 11' are resting. In the condition shown the discharge-circuit is from group 26' by wire 69 to disk 18', then by wire 70 to segment 1' of wheel 12' to brush 11', wire 59, through the lamps thrown into use to wire 58, including magnet 60, to brush 15', to disk 19' by wires 71 72, and to the opposite terminal of the group. This current illuminates the lamps and attracts armature 61, which connects contacts 66 67, causing magnet 35$^d$ to attract its armature, thus bringing the separated terminals of circuit-maker 9$^c$ into the mercury 37$^c$, closing the circuit of the motor M', rotating the commutator to the left. When segments 2' come under brushes 11' 15', group 26' is cut out of the discharging-circuit and group 27' is thrown in, and so on for each successive group, but without interrupting the series connection of the five (or other number) groups of cells. Movement of lever 61 closes the circuit of magnet 64, which closes the circuit of magnet 35$^b$ of circuit-maker 9$^b$, bringing its separated terminals into the mercury 37$^b$, closing circuit 46 47 to the end terminals of the series of groups of cells 26' to 30', 46 47 being the charging-circuit of these cells.

The closing of circuit 46 47 allows the groups of cells 26 to 30 to discharge in series to charge the groups of cells 26' to 30', as above described. Magnet 45 attracts its armature, closing two circuits, namely, bell-circuit 54 and the circuit of magnet 35, which operates the double circuit-maker 9 9', closing the charging-circuit between generator G and one of the groups of cells in the series 26 to 30, but maintaining the series connection of a definite number of groups in the discharge-circuit, this being an important feature of my invention. By changing the relative positions on their wheels of brushes 15 and 11 (or 15' and 11') more than one of the groups can be connected simultaneously to the circuit leading to said brushes.

Except in combination with the automatic controlling devices, I do not claim herein a charging-circuit (as 46 47) adapted to carry a high-tension direct current, a series of storage-cells in groups, all of which are continuously connected in series to the high-tension circuit, a consumption-circuit requiring a current of lower tension than the charging-current, and a commutator for connecting the cells in groups successively to the consumption-circuit and disconnecting them therefrom, the same being claimed in my application, Serial No. 567,695, filed November 2, 1895.

In the system shown in Fig. 6 there is one more group of storage-cells 73 74 75 76 77 than the definite number of groups of cells (for illustration, four) which must be continuously connected to the discharge-circuit. The groups are connected successively to the segments 79 80 of a rotatable commutator. The charging-generator G' is connected to brushes 81 82, bearing on one section of the commutator, connecting one group of cells in the charging-circuit, and said group being entirely removed from the discharge-circuit. 83 84 are brushes so connected as to throw all the other groups into series with each other. As the commutator revolves group 74 is connected momentarily to the charging-generator, and group 73 is at the same instant thrown into series, (thereby keeping the definite number of groups in the discharge circuit,) and so on for successive groups.

I claim—

1. The combination of a charging-circuit having, or adapted to have, a source of direct current connected thereto, a discharge-circuit, a definite number of groups of storage-cells always (when the system is in use) connected in series to the discharge-circuit, a commutator device and circuit connections for connecting the groups of cells successively to the charging-circuit, and an automatic circuit-maker in the charging-circuit, operated by the closing of the discharge-circuit.

4. The combination of a charging-circuit having, or adapted to have, a source of direct current connected thereto, a discharge-circuit, a definite number of groups of storage-cells always (when the system is in use) connected in series to the discharge-circuit, a commutator device and circuit connections for connecting the groups of cells successively to the charging-circuit, a motor for driving the commutator device, and an automatic circuit-maker therefor operated by the closing of the discharge-circuit.

3. The combination of several groups of storage-cells, a charging-circuit and a discharge-circuit therefor, a commutator device and connections constructed and arranged so as to connect the groups of cells in series to one of said circuits, and group by group to the other circuit, a motor for the commutator device, and a circuit-maker operated by the closing of the discharge-circuit.

4. The combination of a charging-circuit having a source of direct current connected thereto, a discharge-circuit, a definite number of groups of storage-cells always (when the system is in use) connected in series to the discharge-circuit, a commutator device, an electric motor for driving it connected to said source of current, a circuit-maker in the motor-circuit, and a magnet energized on the closure of the discharge-circuit to close the motor-circuit.

5. The combination with several groups of storage-cells, of a commutator device consisting of a plurality of wheels, each having as many insulated segments as there are groups of cells, brushes bearing on said wheels, and as many disks plus one as groups of cells, brushes bearing on said disks to which the terminals of the groups of cells are connected, connections from the disks to the segments and between certain of the segments, the connections being such as to close the circuit to the cells, group by group, as described.

Signed this 24th day of February, 1896.

FREDERICK D'A. GOOLD.

Witnesses:
C. L. BELCHER,
CHARLES M. CATLIN.